US012725254B2

(12) United States Patent
Schneider et al.

(10) Patent No.: US 12,725,254 B2
(45) Date of Patent: Sep. 1, 2026

(54) DENTAL PROCEDURES

(71) Applicant: DENTSPLY SIRONA Inc., York, PA (US)

(72) Inventors: Hans-Christian Schneider, Einhausen (DE); David Schader, Burstadt (DE); Helmut Seibert, Alsbach-Hahnlein (DE)

(73) Assignee: Dentsply Sirona Inc., York, PA (US)

( * ) Notice: Subject to any disclaimer, the term of this patent is extended or adjusted under 35 U.S.C. 154(b) by 138 days.

(21) Appl. No.: 18/570,698

(22) PCT Filed: May 17, 2022

(86) PCT No.: PCT/EP2022/063351
§ 371 (c)(1),
(2) Date: Dec. 15, 2023

(87) PCT Pub. No.: WO2023/274622
PCT Pub. Date: Jan. 5, 2023

(65) Prior Publication Data
US 2024/0303809 A1 Sep. 12, 2024

(30) Foreign Application Priority Data
Jul. 1, 2021 (EP) .................................... 21020339

(51) Int. Cl.
*G06T 7/00* (2017.01)
*G06T 19/20* (2011.01)

(52) U.S. Cl.
CPC ............ *G06T 7/0012* (2013.01); *G06T 19/20* (2013.01); *G06T 2207/30036* (2013.01)

(58) Field of Classification Search
CPC .................. G06T 7/0012; G06T 19/20; G06T 2207/30036; G06F 18/24133; G06V 2201/03; G06V 2201/12; G06V 20/64
See application file for complete search history.

(56) References Cited

U.S. PATENT DOCUMENTS 9,008,417 B2 * 4/2015 Rohner .................... G01J 3/02 382/165
10,390,913 B2 * 8/2019 Sabina .............. A61C 13/0004
(Continued)

FOREIGN PATENT DOCUMENTS

CN 107564090 1/2018
EP 3948786 A1 2/2022
(Continued)

OTHER PUBLICATIONS

"European Application Serial No. 21020339.4, Extended European Search Report mailed Mar. 29, 2022", 10 pgs.
(Continued)

*Primary Examiner* — Motilewa Good-Johnson
(74) *Attorney, Agent, or Firm* — SCHWEGMAN LUNDBERG & WOESSNER, P.A.

(57) ABSTRACT

The present teachings relate to a method for transforming a digital 3D dental model to a 2D dental image, the method including: providing, at least two selected images from the 3D dental model; converting, each of the selected images, to a respective color component of a color model; obtaining, by combining the respective color components, the 2D image in a computer-readable format of the color model. The present teachings also relate to a method of classification of the 2D image, a dental procedure assisting system, uses and computer software products.

17 Claims, 6 Drawing Sheets

(56) References Cited

U.S. PATENT DOCUMENTS

| | | | | |
|---|---|---|---|---|
| 10,916,053 | B1* | 2/2021 | Katzman | G06T 7/50 |
| 11,151,753 | B2* | 10/2021 | Gao | G06T 7/70 |
| 11,250,580 | B2* | 2/2022 | Meyer | A61C 9/0053 |
| 11,291,532 | B2* | 4/2022 | Azernikov | G06V 20/653 |
| 11,348,257 | B2* | 5/2022 | Lang | G06T 3/40 |
| 11,985,414 | B2* | 5/2024 | Cramer | G16H 70/20 |
| 12,211,151 | B1* | 1/2025 | Chiou | G06T 19/003 |
| 12,446,994 | B2* | 10/2025 | Salah | A61C 7/36 |
| 2016/0125601 | A1* | 5/2016 | Wu | H04N 23/56 382/128 |
| 2017/0112590 | A1* | 4/2017 | Brown | A61C 1/0015 |
| 2018/0028294 | A1* | 2/2018 | Azernikov | G06F 18/24143 |
| 2019/0259220 | A1* | 8/2019 | Lancelle | G06T 15/50 |
| 2019/0282344 | A1* | 9/2019 | Azernikov | A61C 9/0053 |
| 2020/0000562 | A1* | 1/2020 | Wey | A61C 9/0046 |
| 2020/0105028 | A1* | 4/2020 | Gao | G06T 5/77 |
| 2020/0273248 | A1* | 8/2020 | Jørgensen | G06T 17/205 |
| 2020/0320769 | A1* | 10/2020 | Chen | G06N 3/0464 |
| 2021/0074425 | A1* | 3/2021 | Carter | G16H 30/40 |
| 2021/0090272 | A1* | 3/2021 | Meyer | G06N 3/08 |
| 2021/0153986 | A1 | 5/2021 | Wirjadi et al. | |
| 2021/0251729 | A1* | 8/2021 | Schneider | A61C 9/0053 |
| 2021/0321872 | A1* | 10/2021 | Saphier | A61B 5/004 |
| 2021/0353153 | A1* | 11/2021 | Saphier | G06T 17/20 |
| 2022/0083807 | A1* | 3/2022 | Zhang | G06N 3/084 |
| 2022/0165388 | A1* | 5/2022 | Chernov | G16H 30/20 |
| 2022/0223285 | A1* | 7/2022 | Hirsch | G06T 7/0012 |
| 2022/0262007 | A1* | 8/2022 | Cramer | G06N 3/08 |
| 2022/0304782 | A1* | 9/2022 | Derzapf | A61C 13/0006 |
| 2023/0153476 | A1* | 5/2023 | Fabbri | G06F 30/10 706/47 |
| 2024/0303809 | A1* | 9/2024 | Schneider | G06F 18/24133 |
| 2025/0009483 | A1* | 1/2025 | Ezhov | A61C 9/0053 |

FOREIGN PATENT DOCUMENTS

| | | | |
|---|---|---|---|
| EP | 4113373 | A1 | 1/2023 |
| JP | 2020508734 | A | 3/2020 |
| JP | 2024526606 | A | 7/2024 |
| WO | WO-2019244254 | A1 | 12/2019 |
| WO | WO-2020156896 | A1 | 8/2020 |
| WO | WO-2020201623 | A1 | 10/2020 |
| WO | 2023274622 | | 1/2023 |

OTHER PUBLICATIONS

"European Application Serial No. 21020339.4, Response filed Jul. 4, 2023 to Extended European Search Report mailed Mar. 29, 2022", 83 pgs.

"European Application Serial No. 22730135.5, Noting of Loss of Rights mailed Feb. 22, 2024", 2 pgs.

"European Application Serial No. 21020339.4, Communication Pursuant to Article 94(3) EPC mailed Jan. 23, 2025", 4 pgs.

"International Application Serial No. PCT EP2022 063351, International Search Report mailed Sep. 1, 2022", 5 pgs.

"International Application Serial No. PCT EP2022 063351, Written Opinion mailed Sep. 1, 2022", 8 pgs.

"International Application Serial No. PCT EP2022 063351, International Preliminary Report on Patentability mailed Jan. 11, 2024", 10 pgs.

"European Application Serial No. 21020339.4, Response Filed May 23, 2025 to Communication Pursuant to Article 94(3) EPC mailed Jan. 23, 2025", 8 pgs.

"Japanese Application Serial No. 2023-580417, Notification of Reasons for Rejection mailed Feb. 3, 2026", w/ English Translation, 11 pgs.

* cited by examiner

DENTAL PROCEDURES

CROSS-REFERENCE TO RELATED APPLICATIONS

This is a National Phase application of International Application No. PCT/EP2022/063351, filed May 17, 2022, which claims the benefit of and priority to European Application Ser. No. 21020339.4, filed on Jul. 1, 2021, which are herein incorporated by reference for all purposes.

TECHNICAL FIELD

The present teachings relate generally to computer-implemented methods and products for assisting dental procedures such as restoration. More specifically, the present teachings relate to processing of dental images.

BACKGROUND

Dental procedures such as dental restorations are treatments that are used to restore, either one or more of, the function, integrity, or morphology of missing or damaged dental structure of a patient. Damage or loss of the dental structure or teeth may for example have occurred due to caries or external trauma. Dental restoration may also include replacement of such a structure, for example by dental implants. Generally, for planning restorations, a user may have to manually determine the type of procedure or restoration. Some machines or computerized methods may allow the user to select the type of restoration required. In response to the selection, the machine may proceed to select the tool required to perform the procedure, or even proceed with the restoration based on the user selection.

It is possible that the user may select an incorrect type of procedure as compared to the one that is required. This may happen, for example, due to an error or even inexperience or unfamiliarity with the machine. In such undesirable cases faulty restorations can result, or even an incorrect procedure may be applied to the patient.

US2020000562A1 disclosed a method for constructing a restoration, in which a dental situation is measured by means of a dental camera and a 3D model of the dental situation is generated. In this case, a computer-assisted detection algorithm is applied to the 3D model of the dental situation, wherein a type of restoration and/or at least a tooth number and/or a position of the restoration to be inserted are automatically determined.

WO2018022752A1 disclosed a method of recognizing dental information associated with a dental model of dentition including training a deep neural network to map a plurality of training dental models representing at least a portion of each one of a plurality of patients' dentitions to a probability vector including probability of the at least a portion of the dentition belonging to each one of a set of multiple categories.

US20200273248A1 disclosed a method for generating a corresponding 3D mesh representing a 3D object, including transforming an initial three-dimensional mesh into a planar mesh, wherein each vertex or edge of the planar mesh is a transformation of a vertex or edge from the initial three-dimensional mesh; and sampling the planar mesh to generate a plurality of samples such that each sample comprises a three-dimensional coordinate representing a point in a three-dimensional space derived and/or taken directly from the initial three-dimensional mesh, and a coordinate representing a position of the sample relative to other samples; and generating the sampled matrix based on the plurality of samples; and representing the sampled matrix as a corresponding 3D mesh.

US20200167994A1 disclosed a method for detecting three-dimensional surface geometries of real intraoral structures, where two-dimensional images of intraoral structures are converted into three-dimensional virtual surface geometries.

WO2019243241A1 disclosed a method for constructing a dental component.

The applicant has realized that there is a need of improved methods and products for assisting dental procedures such as restoration.

SUMMARY

At least some of the limitations associated with the foregoing can be overcome by the subject matter of the accompanying independent claims. At least some of the additional advantageous alternatives will be outlined in the dependent claims.

When viewed from a first perspective, there can be provided a method for transforming a digital three-dimensional ("3D") dental model to a two-dimensional ("2D") dental image, which method comprises:

providing, at least two selected images from the 3D dental model, wherein the selected images are dissimilar acquisitions of a dental structure, converting, each of the selected images, to a respective color component of a color model;

obtaining, by combining the respective color components, the 2D image in a computer-readable format of the color model.

Particularly, the 2D image in the present context is a non-photorealistic image. The 2D image is hence a digitally encoded image obtained by converting each of the selected images to their respective color component, without any regard for how the resulting 2D image may appear to a human. By preventing photorealistic emphasis, i.e., closeness of appearance of the 2D image to its real-life object, no special rules need to be adhered to when it comes to the transformation process. Hence, the applicant has realized that applicability of such a 2D image can be enhanced or even improved for machine-readable processes. The 2D image hence does not need to be true to color or depth of features as appearing in a real-life object. For brevity, the term "2D image" shall be referred to in the present disclosure as meaning a non-photorealistic image. Hence, in the present disclosure the terms "2D image" and "non-photorealistic 2D image" may be used interchangeably.

It shall be appreciated that the 3D dental model may either be in the form of a plurality of computerized images, for example, 3D scan data or 3D scan images or a plurality of digital photos, or it may be used to provide, or it may be capable of providing the plurality of computerized images or at least one of the selected images. For example, in some cases, the 3D dental model may at least partially be a computer aided design ("CAD") software generated model. The selected images may be selected from the plurality of computerized images and/or extracted from the CAD model. The 3D dental model may be provided at a memory location such as a database.

Thus, in view of the aforementioned, there can also be provided a method for transforming a digital three-dimensional ("3D") dental model to a two-dimensional ("2D") dental image, which method comprises:

providing, at least two selected images from the 3D model, wherein the selected images are dissimilar acquisitions of a dental structure, converting, each of the selected images, to a respective color component of a color model;

obtaining, by combining the respective color components, the 2D image in a computer-readable format of the color model.

The applicant has realized that by doing so the 3D dental model representative of the dental structure relevant to a patient can be transformed to a format which is particularly suitable for better leveraging data-driven techniques such as machine learning ("ML") and artificial intelligence ("AI"). The present teachings can thus allow transforming 3D information from the 3D model to a 2D representation particularly suitable for computerized classification. A classifiable multi component 2D image can thus be provided that is based on 3D geometries. Resulting 2D image can be more suitable for computationally recognizing the dental structure using data-driven techniques. Thus, for example, dental structures can be more reliably recognized from the non-photorealistic 2D image, which can make providing a correct dental replacement for the patient easier. It can also be enabled to determine, and even apply, the necessary processing steps as required according to the dental structure, for example, by a dental restoration. Another advantage can be that easily available data-driven techniques such as convolutional neural networks ("CNNs") can be applied for detection of the dental structure from the non-photorealistic 2D image thus resulting in a data-driven solution that can be easier to deploy in a dental health environment. CNNs are particularly suitable for image analysis, so by transforming the 3D model to the 2D image as proposed, such techniques can be leveraged for dental feature detection. Thus, by transforming the 3D model to the non-photorealistic 2D image as proposed, a classifiable multi-channel representation based on 3D geometries is provided which can be more suitable and/or easier for applying data-driven techniques.

The 3D dental model may be preexisting at a memory location or it may be generated at the memory location. Thus, the method may include:

providing, at a memory location, the 3D dental model of the dental structure.

Preferably, at least one of the selected images may be a depth map representation of the dental structure. The respective color component, or the respective color channel, may be used to store a depth map image within that component. Hence, the color value of the respective channel may represent depth values as indicated in the depth map. Such a component can be said to represent a 2.5D range image or map.

In some cases, however, at least one of the selected images may be an X-ray image and/or a computer tomography ("CT") image of the dental structure. For example, one of the selected images may be a surface scan image of the dental structure, while an another of the selected images may be a CT image or X-ray image of the dental structure.

Each of the selected images preferably is an acquisition relating to the same axis of the dental structure. For example, one of the selected images may be a surface image or depth map of the dental structure, while an another one of the selected images may be a CT image captured along the same or similar axis from which the surface image is captured. It is not required to specify "similar" in this case as those skilled in the art shall appreciate that it can depend upon the specifics of the dental structure, e.g., complexity and/or size of the structure. As a non-limiting example axes, or points from which the respective acquisitions are captured, which deviate 10 degrees or less from each another with respect to the dental structure may be considered "similar". It shall also be appreciated that in some cases, the CT image may be captured from at or around 180 degrees from the point from which surface image as captured. Even in such cases, the images may be considered as being captured along the same or similar axis. A similar case is also possible, for example, when two selected images are surface images. One of the images may be an acquisition from a "top" side of the dental structure, while the other from the "bottom" side of the dental structure, i.e., both acquisitions being at or around 180 degrees from each another. Such top and bottom images may be transformed using one or more transformations prior to obtaining the 2D image. Such transformations may include mirroring and/or aligning.

The present transformation can have advantage as compared to mesh-based techniques in which a 3D mesh model is flattened to a 2D mesh. In such cases, distortion can occur due to such flattening because only node values of the mesh may be stored in the flattened version and not their relationships. By using the proposed transformation to the 2D image, a better representation of the 3D dental model to the corresponding 2D image is provided. The resulting 2D image can be better comparable for leveraging data-driven techniques. Moreover, aspect ratio of the images from the 3D model can be maintained in the generated 2D image, thus eliminating, or minimizing, distortion.

Additionally, or alternatively, at least one of the selected images may be a feature layer. The feature layer may be representative of boundaries and/or regions of interest and/or attributes of the dental structure. An advantage of this is that additional information such as preparation line courses or other features of interest can be included in the same classifiable 2D image.

Another advantage of the present teachings is that the 2D representation as herein disclosed can be more efficient as compared to traditional approaches. Traditionally, 3D dental structures or dental objects can be represented spatially by triangulations as well as by 3D voxel images. In the literature methods are described which are based on this volume representation. Therefore, a 3D grid volume is spanned in which voxels can be detected. The voxel representation may for example be binary, i.e. (voxel=either a part of the volume, or not a part of the volume). Traditionally used triangulations of dental objects utilized in data processing may be less suitable for processing with data-driven techniques such as neural networks because geometrically different objects can be sub optimally represented by triangulation meshes with unique topology. Furthermore, a major drawback of the voxel representation can be an extensive demand for data storage volume. The proposed representation can thus be fundamentally more compact as compared to a voxel representation with a comparable information content in the 2D image, at least for classification using data-driven techniques.

Hence, pursuant to the present teachings it can thus be enabled to store information from different projections and/or derived features (e.g. preparation line, drilling hole, mesostructures, etc.) from a 3D data set into a single non-photorealistic 2D image. In most cases, the dental geometry can be sufficiently represented by including two dissimilar acquisitions in the 2D image, which can for example be two projections derived from two or more depth map representations, e.g., images with dissimilar projection depths and/or angles. More than two dissimilar acquisitions can also be included. Hence, the dissimilar acquisitions can even be one or more depth map representations and one or more dissimilar feature layers. To further clarify, a few non-limiting examples are, a 2D image which comprises:

1. one depth map layer and one feature layer (represented by two color components), or
2. two dissimilar depth map layers and one feature layer (represented by three color components), or
3. one depth map layer and two dissimilar feature layers (represented by three color components), or
4. two dissimilar depth map layers and two dissimilar feature layers (represented by four color components).

Further color components may be possible if the chosen color model allows it. Thus, the color model may be a custom color model, or it may be a standard color model. However, without limiting the scope or generality of the present teachings, the color model is preferably of a standard type as it can allow easier deployment of data-driven techniques, especially those suitable for image processing or recognition.

Thus, a "color model" in this context refers to a computer-readable model which specifies colors as digital values. These values are specified as a plurality of color components or any of their representation. Most standard color models use three or four values or color components. A few non-limiting examples of three-channel color models are: RGB, RYB, CMY, HSL and HSV. A few non-limiting examples of four-channel color models are: RGBA, RGBW, RGBY and CMYK. The color model can however be any representation, standard or customized, comprising a plurality of channels or components specifying the color values.

Referring to the example 4. above of one of the 2D images, i.e., a 2D image that comprises two dissimilar depth map layers and two dissimilar feature layers. For example, said 2D image may be obtained as follows. By converting a first depth map layer to the "red" component of an RGBA model. Furthermore, a second depth map layer, which is dissimilar to the first depth map layer may be converted to the "green" component, a first feature layer may be converted to the "blue" component, and a second feature layer, which is dissimilar to the first feature layer may be converted to the "alpha" component. These four components can be combined to obtain the 2D image in RGBA format.

Those skilled in the art shall appreciate that the specific sequence in which respective layers are combined in respective components or channels in not limiting to the scope or generality of the present teachings. However, for applying the data-driven techniques, following a defined notation can be advantageous in generating a plurality of 2D images as then the respective components can represent specific information related to the dental structure, thus making classification based on data-driven techniques more suitable. Furthermore, as an alternative to the above, a four component image may even be obtained by combining three depth layers and one feature layer, so the examples given herein are for illustrative purposes for ease of understanding and they do not have a limiting effect on other possible suitable combinations of components and models that may not have been explicitly outlined herein.

As discussed, according to a preferable aspect, the 2D image comprises at least two depth map layers. This can have an advantage that features from different projections or depths of the dental structure can create unique patterns in the color space, which can be more robustly detected using data-driven techniques.

It shall be clear to those skilled in the art that converting each of the selected images to their respective color component of a color model may include creating a color component layer corresponding to each component of the color model. The 2D image in the color model format is thus obtained by combining the color component layers.

The term "dental structure" includes any one or more three-dimensional objects or intraoral geometries related to the oral anatomy, natural and/or man-made. The term may thus include any one or more physical objects such as dentition, dental restorations, their replacements, and such. As a few non-limiting examples, the dental structure may refer to one or more teeth and/or the immediate surroundings of a restoration to be inserted, and/or even a larger area in the oral cavity around the restoration to be inserted and/or the restoration itself. Hence, the dental structure may be a dental situation, or it may be a dental restoration, or even their combination.

The term "dental situation" refers to dental structure recorded using a scanner such as an optical 3D camera.

The dental restoration can be any restoration related to the oral anatomy of the patient. For example, the dental restoration may be produced, or producible, by means of a CAD/CAM method. As some non-limiting examples, the restoration may be any one or more of an inlay, a crown, a bridge, an abutment, a pontic or a veneer.

The term "3D dental model" or 3D model, refers to a computer-readable model of a dental structure, for example a dental restoration or a dental situation, related to a patient. More specifically, in cases when the 3D dental model is a dental situation model, it may be a digital representation of an intra oral cavity or a part thereof of the patient. In cases when the 3D dental model is a dental restoration model, it may be a digital 3D representation of a dental replacement. The dental restoration model may either be output data provided via a CAD software and/or it may include at least one image acquisition of a physical restoration. In some cases, it is possible that the dental structure is a combination of a dental situation and a dental restoration. For example, in cases when the selected images are acquisitions performed on a patient who already has a dental restoration installed. The 3D model may or may not include one or more X-ray and/or CT acquisitions.

Generally, the 3D model is indicative of the dental geometry related to the patient. The 3D dental model may be generated via one or more measurements performed using any one or more imaging systems such as, an oral scanner such as a dental camera or an intraoral scanner and/or X-ray system, and/or CT system. Thus, in some cases, e.g., in case of dental situation, the 3D model may be recorded with the aid of the oral scanner. The recording may capture the dental structure from multiple views and/or depths, for example, any one or more of, an occlusal direction, a lingual direction and/or a labial direction. The 3D model may be in any suitable format, for example as a plurality of 2D representations of 3D objects, including but not limited to, depth map, pseudo-images based on facet information, or other multi-angle images. Some non-limiting examples of 3D representations of 3D objects include volumetric representations, point clouds, primitive-based models, or meshes.

Virtual models can enable the practitioner to study the restoration and/or the intra oral cavity of individual patients via a computer system, in a similar manner as traditional physical plaster model. A 3D model of the intra oral cavity can also allow the practitioner to study methods or approaches when dealing with particular dental problems of a patient. The model may also be used for the design of physical entities, such as prostheses, dental brackets, aligners and so on, e.g., to remedy the dental problems. For example, in prosthodontics, a 3D model of a patient's teeth may be used for providing machining data to manufacture a physical model of the intra oral cavity, and/or to design and manufacture a coping and/or a prosthesis, while in orthodontics the 3D model of a patient's teeth may be manipulated to enable a dental appliance, for example orthodontic brackets and/or aligners, to be designed and manufactured, and/or for designing a treatment.

The term "virtual", as referred herein with respect to models, manipulation of models, and so on, in particular 3D dental models, for example, refers to being created, simulated, manipulated, carried out, and so on by means of a CAD/CAM system, a computer, a computer network, or the like, i.e., in a computer environment, particularly with reference to digital dentistry.

In some cases, an analysis may be carried out in a region of the restoration to be inserted, which can include a preparation, whereby, from various directions, such as an occlusal direction, a mesial direction, a lingual direction, a buccal direction and/or a labial direction. The 3D model may be cut into multiple layers, so-called heightfields. The heightfields of the 3D model may be formed by multiple layers of the 3D model and/or by brightness of each pixel of a heightfield corresponding to the distance between a respective surface point of the 3D model and a defined position of a virtual scanner or camera. Such a heightfield, as specified in the latter, from an occlusal direction would then, for example, contain dark regions, which correspond to surface regions of the 3D model that are disposed further away from the scanner, and contain bright regions, which correspond to surface areas of the 3D model that are disposed closer to the scanner.

In some cases, for example when the 3D model is built from images acquired via optical scanning, initially a plurality of two-dimensional scans or optical images may be acquired or recorded. Then from these acquired scans, relief-like depth information may be obtained. Such information may be considered to be 2.5D, or a 2.5D dataset. Then at least two 2.5D datasets may be combined to build one or more 3D models. The latter step may involve at least one pair-by-pair intersection of the 2.5D datasets. Similarly, when a selected image is a particular view, or it is an acquisition along a particular axis, of the 3D model e.g., a restoration model, such an image is usually 2.5D, or a 2.5D dataset.

Thus, the 3D model may be in the form of a plurality of computer-readable images or one or more datasets. The term "computerized images" is considered to include 3D mesh dataset. As a 3D mesh dataset or a larger dental model may comprise sub-datasets each related to a specific part or view of the dental structure.

Additionally, or alternatively, the 3D dental model may either be a model of the entire oral anatomy, or it may be a model of a part of the oral anatomy. For example, the 3D dental model may be a model representing the entire jaws of the patient, or it may be a model of one of the jaws, or it may be a model of just one tooth, or it may be just a model of an already inserted restoration. Hence, the 3D dental model may pertain to intraoral geometries. In some cases, the 3D model may be purely of dental structures that are not yet mounted in the patient's oral cavity. Hence, the 3D model may in some cases not include any intraoral data of the patient. An example of the latter case is when the 3D model relates to a restoration, or more particularly a restoration which is not yet installed in the patient's oral cavity.

The 3D model may even be a combination of a plurality of 3D sub-models, for example the 3D model may be a combination of a 3D model of a tooth and a 3D model of a crown.

In some cases, the 3D model which is in the form of a 3D representation or point space may be converted to a 2D representation, e.g., by flattening, prior to converting to a color component of the color model.

Thus, according to one aspect, the method may also comprise:

converting, at least one of the selected images, to a 2D representation.

Hence, the at least one of the selected images which is a 3D representation is converted first to the 2D representation prior to being converted to its respective color component of the color model.

The term "selected image" refers to a computer-readable image or dataset that is converted to build the 2D image in the format of the color model, or a 2D color image. Each of the selected images is thus an acquisition which pertains to the same dental structure but with different properties as compared to the rest of the selected images. For example, the properties may be any one or more of projection depth, cross-section, perspective view or direction. As a further non-limiting example, two selected images which are being used for obtaining the 2D color image may have different projection depth, or they may have non-identical depth maps, or they may be dissimilar depth images of the same dental structure. Additionally, or alternatively, at least one of the selected images may be, or it may comprise, a feature layer representative of boundaries (e.g. preparation margins, holes, connection interfaces) and/or regions of interest and/or attributes (e.g. contact area, high detail area, safety area, curvatures) of the dental structure. The features/attributes can be obtained, e.g., by established algorithms from geometry or image processing. Thus, the feature layer may specify one or more boundaries or areas relevant for processing. For example, if certain regions or the dental structure need to be processed in a certain manner, this requirement can be provided within the feature layer.

A selected image may either be acquired via an imaging device such as a scanner, X-ray or CT system, or it may be an acquisition of a projection or cross section obtained via a CAD software. Similarly, a feature layer is also an acquisition, for example, provided via a CAD software or system.

As outlined earlier, each of the selected images is converted to a non-identical color component of the color model. Optionally, one or more feature layers are also converted to their respective individual color components each of which is different from the color components of the other components of the color model.

Each of the color components, or color component layers, are then combined to obtain the 2D image of the color model. Combining the color components or color component layers may include performing one or more other functions or transformations such as, mirroring, rotating, cropping, normalizing, resizing, aligning. For example, mirroring, rotating, alignment and/or normalization between any two layers may be done automatically via a computing unit by using distinctive features such as matching features as between the two layers. Alternatively, at least one or the other functions such as alignment or normalization may be performed on the selected images. Additionally, or alternatively, one or more selected images and/or the respective color components may be processed prior to combining. Thus, said processing may include any one or more of transformations such as, mirroring, rotating, aligning, altering contrast, brightness, saturation, etc.

According to an aspect, the method also comprises:

providing, as an input, the 2D image to a trained data-driven logic;

determining, via the data-driven logic, a classification value of the 2D image.

The data-driven logic which has been trained using a plurality of historical 2D images can thus be leveraged to classify the 2D image. Preferably, the data-driven logic is trained using the historical 2D images that were generated in the same manner as the 2D image.

The 2D image, which is representative of the dental structure is thus analyzed by means of the trained data-driven logic. One or more characteristics related to the dental structure are thus analyzed via the trained data-driven logic to determine the classification value. The classification value may be a statistical or probability value associated with a type of the dental structure and/or it may directly specify the type of the dental structure. For example, the trained data-driven logic may analyze the shape and/or color distribution of the 2D image to determine the classification value. Since one or more similar types of dental structures when transformed according to herein disclosed method to one or more 2D images transform to one or more depth and/or feature characteristics of similar nature, data-driven techniques can be leveraged to detect such characteristics or their patterns using the 2D image as an input file to the trained data-driven logic. By detecting said characteristics and/or patterns the trained data-driven logic generates an inference as the classification value.

Another advantage of utilizing the color components layers of the color model to store different selected images is that features associated with similar structures visible in the selected images can blend according to the respective color values to produce distinct color combinations and/or shapes such that these can be learned and detected via the data-driven logic. Thus, multi-dimensional/depth information can be detected via the same 2D image. Another advantage can be that the 2D image despite containing multi-dimensional/depth information may still be recognizable by a human user. This may be beneficial for example if a user wants to verify the classification performed via the data-driven logic. This can be possible by viewing the 2D image.

Hence, the when viewed from another perspective of classification, there can even be provided a method for classifying a dental structure using a trained data-driven logic, which method comprises:

providing, as an input, a 2D image to the trained data-driven logic;

determining, via the data-driven logic, a classification value of the 2D image;

wherein the 2D image is in a computer-readable format of a color model, and wherein the 2D image has been obtained by converting each of at least two selected images to a respective color component of the color model, and wherein the selected images are dissimilar computerized acquisitions of the dental structure.

Thus, the present teachings can be advantageously leveraged for classification of dental structures using the 2D image as herein disclosed.

The applicant has found the present teachings particularly advantageous for classifying dental restorations. One of the advantages in this regard can be that 3D models of most dental restorations are already available in digital form, e.g., via a CAD software. Thus, by porting at least two selected images, particularly at least one of them being a depth map, from the digital 3D model, the 2D image as herein disclosed may be generated. The training data for the data-driven logic can thus be more easily generated. This can enable deployment of an automatic dental structure classification solution easier. Moreover, when a user such as a dental practitioner or lab technician has selected a dental restoration, this can more quickly be classified using the trained data-driven logic and a confirmation provided to the user. This can prevent mistakes and even incorrect procedure, or preparation be performed.

The term "data-driven" model or logic refers to digital model or computational logic that is trained with statistical and/or heuristic information from training dataset comprising big data. Such logic or model may be a so called "black-box" model that derives its functionality purely from the training dataset, or it can be a "grey-box" which also comprises an analytical or mechanistic logic part. Some non-limiting examples of data-driven logic are artificial neural networks ("ANNs") and convolutional neural networks ("CNNs").

Thus, the trained data-driven logic may comprise an ANN. More specifically, the trained data-driven logic can comprise a CNN. The CNN is a feedforward artificial neural network. CNNs belong to the field of machine learning that is inspired by biological processes. For example, a CNN generally comprises a convolutional layer which is followed by a pooling layer. In principle, this unit can be repeated as often as desired. When comprising a plurality of repetitions, they may be referred to as deep CNNs which fall into the area of so-called deep learning. CNNs are trained by learning free parameters or classifiers of convolution kernels per layer and the weighting thereof for the offset to the next layer within the network. The applicant has realized that CNN based data-driven logic can be particularly advantageous for classifying dental structures using the 2D image in the color model format as disclosed herein.

In some cases, the classification value may be processed further to provide an output signal. For example, in cases when the classification value is a statistical value, said statistical value may be used for further computation to generate the output signal. The output signal may provide an inference or a determination, for example selecting a particular type of dental structure, e.g., a specific restoration.

According to an aspect, the method further comprises:

generating, in response to the classification value, an output signal.

The classification value and/or the output signal may be provided to a human machine interface ("HMI") system or device. The HMI device may be a video device and/or an audio device. Thus, the HMI system may comprise a visual display for outputting visual output and/or instructions and/or it may be an audio device for outputting audible instructions. For example, the HMI system may comprise a loudspeaker that audibly instructs or aids a user to make a right determination or decision by outputting the classification value and/or output signal. For example, based upon the inference or determination, the HMI system may audibly inform the user that the dental structure is of a specific type, e.g., a cavity, an aligner, or a crown.

Additionally, or alternatively, the HMI device may comprise a visual display such as a video screen which visually instructs or aids the user to make a correct determination of the dental structure. The display may be a screen such as an LCD or LED screen, and/or it may be an augmented reality ("AR") device. Thus, visual display may at least partly be an AR device or system. Similarly, for example, based upon the inference or determination, the HMI system may visually inform the user about the type of the dental structure. In cases when the classification value is used to provide to the user, audibly or visually, a statistical value, e.g., 95% certainty, related to the dental structure, the teachings can help the user to be aware if further analysis may be needed to confirm the determination. This can even be done by providing a confidence value to the user. For example, in cases where the confidence value is low, a different input to the data-driven model may be provided related to the dental structure. The different input may be a new 2D image that is generated again and/or processed as necessary, with an objective to improve the confidence value. Additionally, or alternatively, a different 3D model or part thereof may be converted to a new 2D image with an objective to improve the confidence value. This can also help preventing wrong determinations from being made based on the 2D image if the 2D image is not in a format or color component sequence as properly classifiable by the trained data-driven logic.

Additionally, or alternatively, the output signal may be indicative of a dental procedure, e.g., a procedure that needs to be performed for the dental structure. As non-limiting examples, the dental procedure may be any one or more of, milling, grinding, and printing. More specifically, the dental procedure may be any manufacturing or machining procedure related to a dental restoration.

Additionally, or alternatively, the method may further comprise:

automatically selecting, in response to the classification value and/or the output signal, a tool for use in the dental procedure.

Thus, one or more tools that are required for the dental procedure can be automatically specified or even prepared or enabled. By prepared, it may also include specifying or configuring any one or more process parameters like fine, rough, fast, slow and/or materials (e.g., ceramics, resins for printing, etc.). The automatic selection in this way can save time for the user and/or prevent wrong tools from being used.

The term “tool” or more specifically “machining tool” may be used herein interchangeably to include any tool that is adapted for material removal, and may include inter alia mechanical tools such as chamfers, grinders or drills for example, laser tools such as for example laser drills or cutters, ultrasonic tools such as for example ultrasonic cutters, and the likes. In some cases, the machining paths and material removal characteristics of such tools can be controlled, for example, by computer systems or other automated means. In some cases, a replacement or restoration can be fully automatically produced from a blank by means of a CAM grinding machine using the dental procedure in response to the classification value and/or the output signal. Additionally, or alternatively, other techniques such as additive manufacturing may be used. The production may be based on a 3D model of restoration. This can have an advantage that the restoration can be produced fully automatically without user intervention or interaction.

In some cases, should the user want to override the indicated dental procedure, for example, for selecting an alternative procedure, the user may do so by providing a feedback input. Alternatively, the user may proceed with the dental procedure. Thus, the method may also comprise:

receiving, via the HMI, a feedback input indicative of whether the dental procedure indicated by the output signal is to be performed or not.

As discussed, the 2D image as generated according to the present teachings can enable more effective application of data-driven techniques on information that is transformed from a 3D model of the dental structure. A plurality of 2D images obtained as disclosed herein can be leveraged as training data for data-driven techniques. Thus, when viewed from another perspective, there can also be provided a 2D image which is obtainable by the method aspects herein disclosed. A plurality of such images can be used as a training dataset. According to an aspect, the training dataset may comprise one or more simulated images. A simulated image may be an image that is at least partially virtual. By virtual in this context, it is meant an image or a part thereof that is not a direct impression captured from a real-life object, rather it is generated via a computing unit. Accordingly, the simulated image may even be a fully virtual image, i.e., a computer generated or synthetic image. A synthetic image can be considered that image which allows a digital real-life photo or image to be replaced with synthetic data. For example, an image provided via a CAD software may be considered a computer generated or synthetic image. It shall be appreciated that any of the simulated images may either be fully synthetic or they may be partially synthetic, i.e., containing both real-life and virtual components. Some of the simulated images may even be constructed by modifying real-life images. Thus, the training dataset can be enhanced for training the data-driven logic to detect specific features despite a limited number of real-life images being available.

The 2D image can be provided at a memory location or storage at which the training dataset is collected and/or it may be a location from where it can be accessed from when needed. Thus, the method may further comprise:

providing, at a memory storage, the 2D image, and optionally also the feedback input.

Thus, the 2D image is optionally also the related feedback input which are collected or accessible from the memory storage. An advantage of linking the feedback input to the 2D image can be that it can be used for improving classification by the data-driven logic. For example, the historical 2D images those are associated with a positive feedback signal, i.e., the user proceeded with the procedure as indicated by the output signal, may be emphasized or prioritized for training the data-driven logic. This can for example be done by providing extra weight to those images or datapoints which are associated with a positive feedback signal. Additionally, or alternatively, the historical 2D images those are associated with a negative feedback signal, i.e., the user chose not to proceed with the procedure as indicated by the output signal, may be deemphasized or deprioritized for training the data-driven logic. This can for example be done by providing lower weights to those images or datapoints which are associated with a negative feedback signal, or perhaps even removing some or all such images from the training dataset. The training dataset comprising 2D images as disclosed herein can thus be improved. This can reduce dataset size while improving the determination using the trained data-driven logic.

So, the data-driven logic is trained using a training dataset or model training dataset comprising a plurality of 2D images as herein disclosed.

For example, when viewed from an aspect, the method may comprise:

providing, at an input of data-driven logic, model training data comprising a plurality of historical 2D images, and optionally also the feedback input; whereby the model training data is used to train the data-driven logic to obtain the trained data-driven logic.

Thus, the method may include a training phase as, or similar to, the above.

Those skilled in the art shall appreciate that the method steps may be carried out via the same computing unit or different ones.

When viewed from another perspective, there can also be provided model training dataset comprising a plurality of 2D images as generated by the method aspects herein disclosed.

When viewed from another perspective, there can also be provided a computer storage medium storing the 2D image or the model training dataset as herein disclosed.

When viewed from another perspective, there can also be provided a use of the classification value and/or the output signal as generated in any of the method steps herein disclosed for assisting and/or performing a dental procedure.

When viewed from another perspective, there can also be provided a system for assisting a dental procedure, wherein the system is configured to perform the methods herein disclosed.

For example, there can be provided a dental procedure assisting system, wherein the system comprises at least one computing unit, the system being configured such that any one or more of the computing units is configured to:

provide, from a digital three-dimensional ("3D") dental model, at least two of computerized images as selected images, wherein the selected images are dissimilar acquisitions of a dental structure, convert, each of the selected images, to a respective color component of a color model; and obtain, by combining the respective color components, the 2D image in a computer-readable format of the color model.

The system may even be configured such that any one or more of the computing units is configured to:

operatively connect to a memory location for obtaining or accessing the 3D dental model.

The at least two of computerized images may even be selected from the 3D dental model, or they may be provided as an output of the dental model. Similarly, there can also be provided for example, a dental procedure assisting system, wherein the system comprises at least one computing unit, the system being configured such that any one or more of the computing units is configured to:

provide, as an input, a 2D image to the trained data-driven logic;

determine, via the data-driven logic, a classification value of the 2D image;

wherein the 2D image is in a computer-readable format of a color model, and wherein the 2D image has been obtained by converting each of at least two selected images to a respective color component of the color model, and wherein the selected images are dissimilar computerized acquisitions of a dental structure.

Any of the systems herein disclosed may comprise one or more computing units. Optionally, any of the systems and/or any of the computing units may be configured to operatively connect to a network, e.g., via one or more network interfaces and/or connectivity interfaces.

The memory location may be a part of a computing unit and/or the system, or it may be located remotely operatively accessible via any of the computing units.

When viewed from another perspective, there can also be provided a computer software product, or a non-transitory computer-readable storage medium storing the program, comprising instructions which when executed by a suitable computing unit cause the computing unit to perform any of the methods herein disclosed.

For example, there can be provided a computer software product, or a non-transitory computer-readable storage medium storing the program, comprising instructions which when executed by a suitable computing unit cause the computing unit to:

provide, from a digital three-dimensional ("3D") dental model, at least two of the computerized images as selected images, wherein the selected images are dissimilar acquisitions of a dental structure, convert, each of the selected images, to a respective color component of a color model; and obtain, by combining the respective color components, the 2D image in a computer-readable format of the color model.

The computer software product, or a non-transitory computer-readable storage medium storing the program, may even comprise instructions which when executed by the suitable computing unit cause the computing unit to:

operatively connect to a memory location for obtaining or accessing the 3D dental model.

Similarly, there can also be provided for example a computer software product, or a non-transitory computer-readable storage medium storing the program, comprising instructions which when executed by a suitable computing unit cause the computing unit to:

provide, as an input, a 2D image to the trained data-driven logic;

determine, via the data-driven logic, a classification value of the 2D image;

wherein the 2D image is in a computer-readable format of a color model, and wherein the 2D image has been obtained by converting each of at least two selected images to a respective color component of the color model, and wherein the selected images are dissimilar computerized acquisitions of a dental structure.

A computer-readable data medium or carrier includes any suitable data storage device on which one or more sets of instructions (or software) are stored for implementing any one or more methodologies disclosed herein. The instructions may even reside partially, or completely, within the main memory and/or within the processor during execution thereof by the processing unit, computing unit, and main memory, which may constitute computer-readable storage media. The instructions may even be transmitted or received over a network via a network device.

The computer program for implementing one or more of the embodiments described herein may be stored and/or distributed on a suitable medium, such as an optical storage medium or a solid state medium supplied together with or as a part of another hardware, but may also be distributed in other forms, such as via the Internet or other wired or wireless telecommunication systems. However, the computer program may also be presented over a network like the World Wide Web and can be downloaded into the working memory of a data processor from such a network.

Furthermore, data carrier or a data storage medium for making a computer program product available for downloading can also be provided, which computer program product is arranged to perform a method according to any of the methods herein disclosed.

When viewed from another perspective, there can also be provided a computing unit comprising the computer program code for performing the method herein disclosed. Also, there can be provided a computing unit operatively coupled to a memory storage comprising the computer program code for carrying out any of the methods herein disclosed.

That two or more components are "operatively" coupled or connected shall be clear to those skilled in the art. In a non-limiting manner, this means that there may be at least one communicative connection between the coupled or connected components e.g., they are the network interface or any suitable interface. The communicative connection may either be fixed, or it may be removable. Moreover, the communicative connection may either be unidirectional, or it may be bidirectional. Furthermore, the communicative connection may be wired and/or wireless. In some cases, the communicative connection may also be used for providing control signals.

"Processing unit" or "computing unit" may comprise, or it may be, a processing means or computer processor such as a microprocessor, microcontroller, or the likes, having one or more computer processing cores.

"Computer processor" refers to an arbitrary logic circuitry configured for performing basic operations of a computer or system, and/or, generally, to a device which is configured for performing calculations or logic operations. In particular, the processing means or computer processor may be configured for processing basic instructions that drive the computer or system. As an example, the processing means or computer processor may comprise at least one arithmetic logic unit ("ALU"), at least one floating point unit ("FPU"), such as a math coprocessor or a numeric coprocessor, a plurality of registers, specifically registers configured for supplying operands to the ALU and storing results of operations, and a memory, such as an L1 and L2 cache memory. In particular, the processing means or computer processor may be a multi core processor. Specifically, the processing means or computer processor may be or may comprise a central processing unit ("CPU"). the processing means or computer processor may be a complex instruction set computing ("CISC") microprocessor, reduced instruction set computing microprocessor ("RISC"), Very long instruction word ("VLIW") microprocessor, a processor implementing other instruction sets or processors implementing a combination of instruction sets. The processing means may also be one or more special purpose processing devices such as an application specific integrated circuit ("ASIC"), a field programmable gate array ("FPGA"), a complex programmable logic device ("CPLD"), a digital signal processor ("DSP"), in next word processor, or the like. The methods, systems and devices disclosed herein may be implemented as software in a DSP, in a microcontroller, or in any other side processor such as hardware unit within an ASIC, CPLD, or FPGA. It is to be understood that the term processing means or processor may also refer to one or more processing devices, such as a distributed system of processing devices located across multiple computer systems (such as cloud computing), and is not limited to a single device unless otherwise specified.

"Connectivity interface" refers to a software and/or hardware interface for establishing communication such as transfer or exchange of signals or data. The communication may either be wired, or it may be wireless. Connectivity interface is preferably based on or it supports one or more communication protocols. The communication protocol may be a wireless protocol, for example: short distance communication protocol such as Bluetooth®, or Wi-Fi, or long communication protocols such as cellular or mobile network, for example, second generation cellular network ("2G"), 3G, 4G, long term evolution ("LTE"), or 5G. Alternatively, or in addition, the connectivity interface may even be based on proprietary short distance or long distance protocol. The connectivity interface may support any one or more standards and/or proprietary protocols.

"Network interface" refers to a device or a group of one or more hardware and/or software components that allow an operative connection with the network.

"Memory storage" may refer to a device for storage of information, in the form of data, in a suitable storage medium. Preferably, the memory storage is a digital storage suitable for storing the information in a digital form which is machine readable, for example digital data that are readable via a computer processor. The memory storage may thus be realized as a digital memory storage device that is readable by a computer processor. Further preferably, the memory storage on the digital memory storage device may also be manipulated by a computer processor. For example, any part of the data recorded on the digital memory storage device may be written and or erased and or overwritten, partially or wholly, with the new data by the computer processor.

"Network" discussed herein may be any suitable kind of data transmission medium, wired, wireless, or their combination. A specific kind of network is not limiting to the scope or generality of the present teachings. The network can hence refer to any suitable arbitrary interconnection between at least one communication end point to another communication end point. Network may comprise one or more distribution points, routers or other types of communication hardware. The interconnection of the network may be formed by means of physically hard wiring, optical and/or wireless radio frequency ("RF") methods. The network specifically may be, or it may comprise, a physical network fully or partially made by hard wiring, such as a fiber optical network or a network fully or partially made by electrically conductive cables or a combination thereof. The network may at least partially comprise the Internet.

DETAILED DESCRIPTION

Certain aspects of the present teachings will now be discussed with reference to the accompanying drawings that explain said aspects by the way of examples. Since the generality of the present teachings is not dependent on it, the drawings may not be to scale. Method and system aspects may be discussed in conjunction for ease of understanding. Certain features shown in the drawings may be logical features that are shown together with physical features for the sake of understanding and without affecting the generality or scope of the present teachings.

Figure 1:
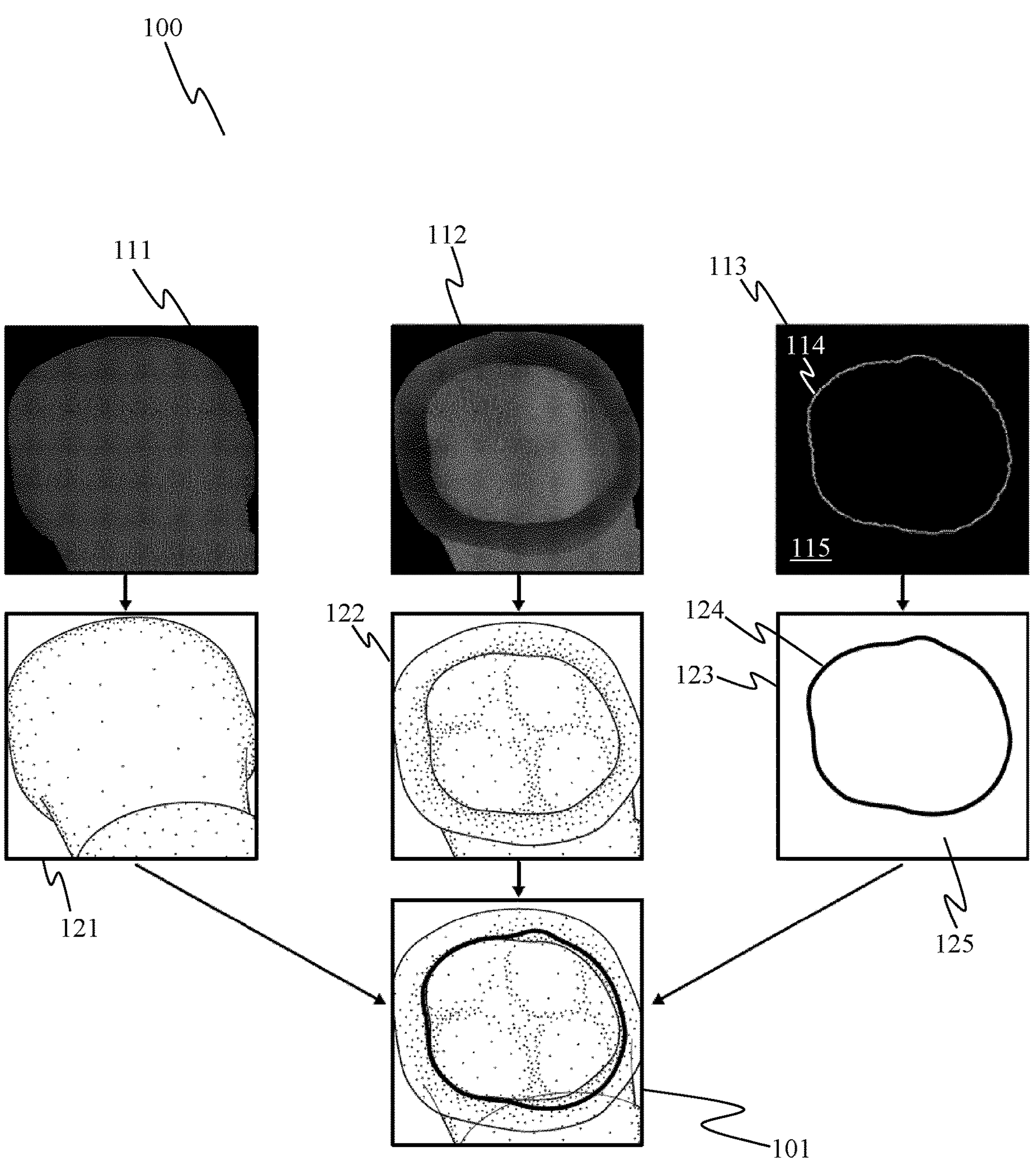
FIG. 1 illustrates an aspect for obtaining a 2D image of a dental crown.

The reference numbers shown in the drawings denote the elements which will be referred to in the subsequent description of the examples of the present teachings:

In accordance with example aspects described herein, methods, systems and computer readable storage media can be provided, e.g., for assisting a dental scan.

FIG. 1 illustrates a schematic flow 100 showing obtaining of a two-dimensional dental image 101 in a computer-readable format of a color model. The color model in this non-limiting example is an RGB model. Accordingly, the 2D image 101 in this case is a computer readable RGB image. The 2D image 101 is a transformed version of a digital three-dimensional dental model. A digital 3D dental model, or simply referred to as the 3D model, may be represented by a plurality of dissimilar acquisitions of a dental structure related to a patient. The dental structure in this example is a restoration, more specifically, a dental crown. As shown in this example, three images, or three selected images 111, 112 and 113, are provided from the 3D model. The 3D model could be a CAD model of the dental crown shown in FIG. 1. The selected images 111, 112 and 113 are dissimilar acquisitions of the dental crown, for example, the first image 111 and the second image 112 are related to the same crown, but with different views. In some cases, the images may even relate to different depths into the crown structure. In this example, the first image 111 is a top projection of the dental crown, whereas the second image 112 is a bottom projection of the dental crown. Thus, the first image 111 and the second image 112 relate to the same axis of the crown, for example a virtual axis running through the height of the dental crown. Preferably each of the selected images 111, 112 and 113 have the same or similar scale. As a few non limiting examples, each of the images 111, 112 and 113 may be an image with 1:1 scale or thereabouts with respect to the dental crown, or each of them are 10:1 scale or thereabouts with respect to the size of the dental crown. A specific scaling factor or a precise matching between scale of one image to another is not limiting with regards to the generality of the present teachings.

The first image 111 and the second image 112 are shown here as greyscale depth images. The first image 111 and the second image 112 may be provided via a 3D CAD model of the dental crown. Alternatively, or in addition, at least one of the images 111 and 112 may be an image acquisition e.g., an optically captured image, or even an X-ray or CT image of the dental crown.

It shall be appreciated that in some cases there can just be two selected images, instead of three, for obtaining the 2D image 101. Any one of the color components or channels can thus be blank or set to a pre-determined state. Such a two-component image may be obtained using: the first image 111 and the second image 112; or the first image 111 and the third image 113; or the second image 112 and the third image 113. A particular sequence or specific component which the respective image should be converted to is not limiting, however, the image should preferably be obtained in the similar sequence or format as the training data that a trained data-driven logic has been trained with. This can allow proper classification of the 2D image 101 using the trained data driven logic.

The third image 113 that is shown in this example is a feature layer which may be representative of boundaries and/or regions of interest and/or attributes of the dental crown. In this case, the third image 113 shows a boundary 114 of the dental crown. Some other non-limiting uses of the feature layer include, preparation margin, area or line representation of specific processing steps, and the like.

Each of the selected images 111, 112 and 113 is converted to a respective color component of the color model, via any one or more computing units. As seen, the first image 111 is converted to the red component 121 or red channel of the RGB model. Similarly, the second image 112 is converted to the green component 122 or channel of the RGB model, and the third image 113 is converted to the blue component 123 or channel of the RGB model. In case of depth images such as the first image 111 and the second image 112, the respective color component may be used to store depth map values within that component. For example, the greyscale values of the first image 111 are converted to red color values of the converted red image or layer 121. Similarly, the greyscale values of the second image 112 can be converted to green color values of the converted green image or layer 122. In case of the feature layer 113, for example, just the boundary 114 is converted to corresponding blue values 124 in the converted blue image or layer 123. The area 115 of the feature layer 113 which does not represent the boundary can be left blank or it may be set to another pre-determined color value 125 in its respective color component layer, in this example the blue component 123.

By conversion it is meant either a direct conversion of the respective grey values to the color values of the corresponding color component, or it may involve a processing function using any predetermined function, for example, inversion.

The color model may be any other multicomponent digital color model besides RGB. In cases where the color model has more components, additional images or layers can be provided. For example, if an RGBA model is used, the fourth channel could be used for providing another feature layer or another depth image.

The 3D dental model, i.e., a model either comprising the selected images 111, 112 and 113, or a model providing said images, may be provided at a memory location for example at a local memory of a computing unit and/or at a network or cloud storage. The selected images 111, 112 and 113 may either be provided directly via a CAD system, an imaging system such as a scanner and/or X-ray or CT system, or they may have been processed after acquisition via the system. The system may be directly or indirectly connected to the memory storage and/or the computing unit.

The 2D image 101 is thus obtained by combining or merging the color components 121, 122 and 123, without any regard for photorealisticness. The 2D image 101 thus includes features from each of the selected images 111, 112 and 113. Thus, 3D information can be provided within a single image, i.e., as in the 2D image 101. The 2D image 101 is advantageously a non-photorealistic image. The term photorealistic is known to the person skilled in the art. Photorealistic images are those which are an accurate, or as close as possible, depiction of their corresponding real-life objects. A photorealistic color image will thus have same or similar colors as the real-life object it relates to. The applicant has found that by removing the photorealistic requirement from the herein proposed 2D image 101, the color space can be better utilized for machine-based evaluation of dental structures. The applicant has thus found such a non-photorealistic 2D image 101 to be particularly suitable for analysis, such as classification, using data-driven techniques or data-driven logic. Furthermore, training data or model training data which comprises a plurality of such images as the 2D image 101 is usable for training one or more data-driven logic units. Preferably, the model training data comprises 2D images, which have been obtained in similar manner, i.e., similar depths converted to the same kind of color channel. Furthermore, the applicant has found the data-driven logic comprising one or more CNNs to be a particularly suitable for classifying the 2D image 101.

Figure 2:
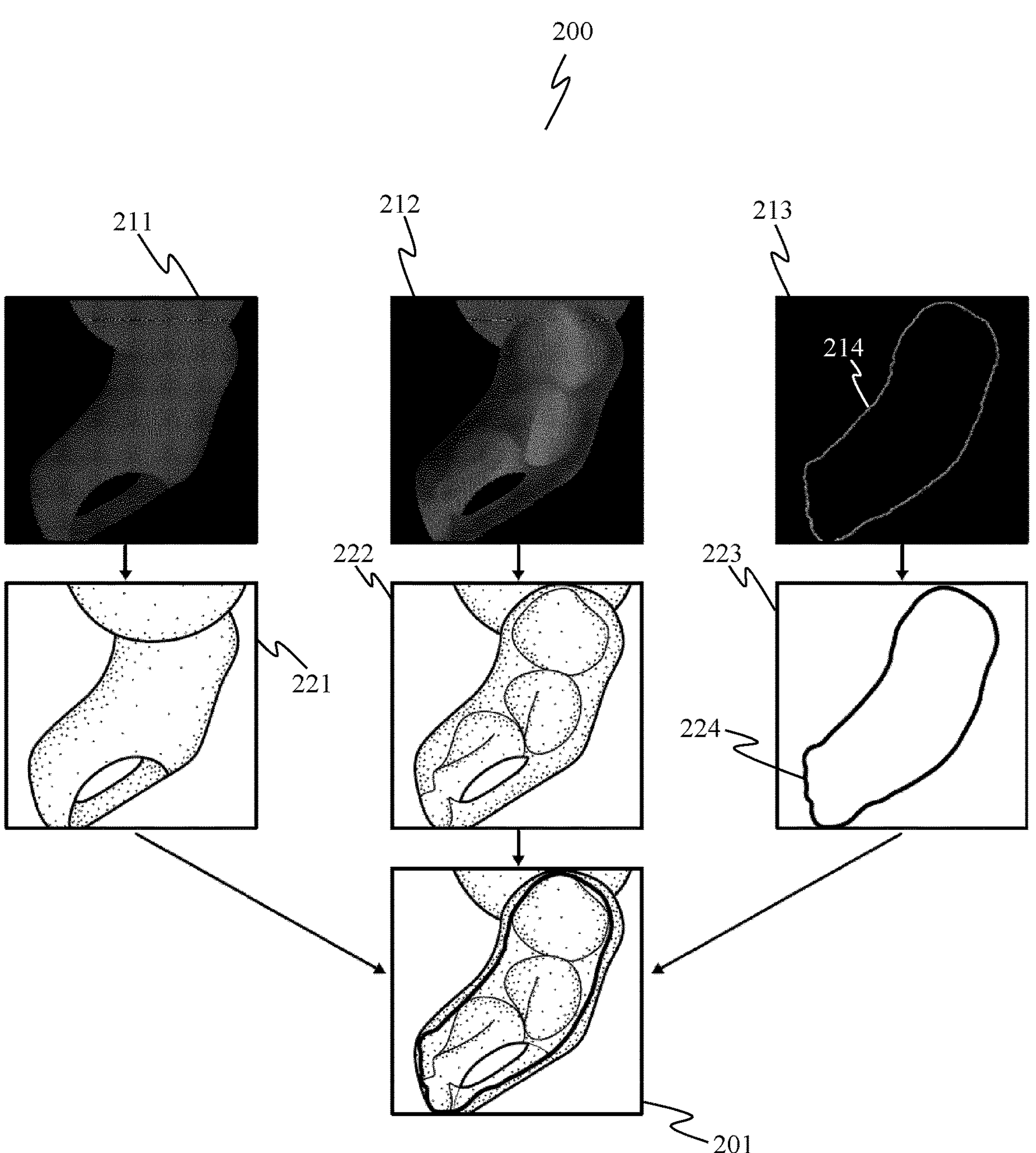
FIG. 2 illustrates an aspect for obtaining a 2D image of a guide.

FIG. 2 illustrates another schematic 200 showing obtaining of another two-dimensional dental image 201 of another dental structure. The second 2D image 201 relates to a dental structure which is a surgical guide. The color model in this non-limiting example is also an RGB model. Thus, the second 2D image 201 is also a computer readable RGB image. The second 2D image 201 is a transformed version of a second digital three-dimensional dental model. The second digital 3D dental model, or simply referred to as the second 3D model, is represented by a plurality of dissimilar acquisitions of the dental structure related to a patient. Thus, as it will be appreciated, the dental structure in this particular example is shown as a guide.

As shown in this example, another three images, or another three selected images 211, 212 and 213, are provided from the second 3D model. The another selected images 211, 212 and 213 are dissimilar acquisitions of the guide, for example, the another first image 211 and the another second image 212 are acquired for the same guide, but with different projections or depths. For example, the another first image 211 is a top projection of the surgical guide, whereas the another second image 212 is a bottom projection of the guide. Those skilled in the art shall appreciate that "top" and "bottom" are merely used here in a relative sense for ease of understanding. More specifically, this is done to show a preferable aspect of the teachings, i.e., the selected images preferably being related to the same axis of the dental structure, as this can make it easy to align and overlay the layers for generating the 2D image. Similarly, "side" views may even be used for some dental structures. More generally, projections related to any opposite sides of the dental structure may be used and/or any internal section (e.g., CT image or such) along the same or similar axis.

The another first image 211 and the another second image 212 are shown here as greyscale depth images related to the guide. As was already discussed in reference to FIG. 1, just two component images may be enough. Accordingly, any two or more channels may be used. Similar to as discussed in FIG. 1, the color model may even have more than three channels. However, in some cases, for example when performing classification using the same data-driven logic, it can be advantageous for the another 2D image 201 to be obtained in a similar manner as the 2D image 101.

As the 2D image 101, the further third image 213 also comprises a feature layer.

Each of the further selected images 211, 212 and 213 is converted to a respective color component of the color model. As seen, the further first image 211 is converted to the red component 221 or red channel of the RGB model. Similarly, the further second image 212 is converted to the green component 222 or channel of the RGB model, and the further third image 213 is converted to the blue component 223 or channel of the RGB model. The further feature layer 213 is converted to corresponding blue values 224 in the converted blue image or layer 223.

The second 2D image 201 is thus obtained by combining or merging the color components 221, 222 and 223. The second 2D image 201 thus includes features from each of the further selected images 211, 212 and 213. For example, the 2D image 101 and the second 2D image 201 can be included in the model training data which is used for training the data-driven model such as a CNN. Accordingly, when in a subsequent 2D image a given dental structure is provided, e.g., as an input, at the data-driven logic trained using the model training data, the data-driven logic can analyze and classify the subsequent 2D image based on the features learned from the model training data. Hence, if the subsequent 2D image relates to a surgical guide, the data-driven logic can classify it as surgical guide based upon the features learned from the second 2D image 201. The data-driven logic may perform the classification by determining or providing a classification value for the subsequent 2D image. Similarly, the 2D image 101 and/or the second 2D image 201 may even be provided to a data-driven logic trained using historical 2D images. In some cases, an output signal may be provided which may be the classification value itself or it may be a different signal. Preferably, the model training data or training data comprising historical 2D images relate to a plurality of different dental structures such that the trained data driven logic can analyze any given dental structure and provide one or more classification values and/or output signals. This can enable detecting or inferencing different kinds of dental structures, and thus enable providing suitable dental restoration and/or procedure for the patient according to the specific needs of the patient according to the specific dental structure.

The classification value and/or the output signal may be provided to an HMI system, for example for guiding a user (e.g., a dental practitioner or assistant) in properly assessing the dental structure related to a patient. This can help reduce incorrect assessments, and in some cases even performing an incorrect procedure on the patient.

In some cases, a dental procedure and/or a tool for use in the dental procedure may be selected or performed in an automatic fashion, e.g., in response to the classification value and/or the output signal.

In some cases, a user feedback input may be received via the HMI system. The feedback may be indicative of whether the dental procedure indicated by the output signal is to be performed or not. The feedback may be included in the model training data and leveraged to prioritize those classifications which were positively selected by the user. This can further improve the future classification operations.

The method aspects such as transformation and/or classification of the images are performed using one or more computing units or a computerized system. Accordingly, a novel and inventive system can also be provided which is configured to perform the method aspects of the present teachings.

Figure 3:
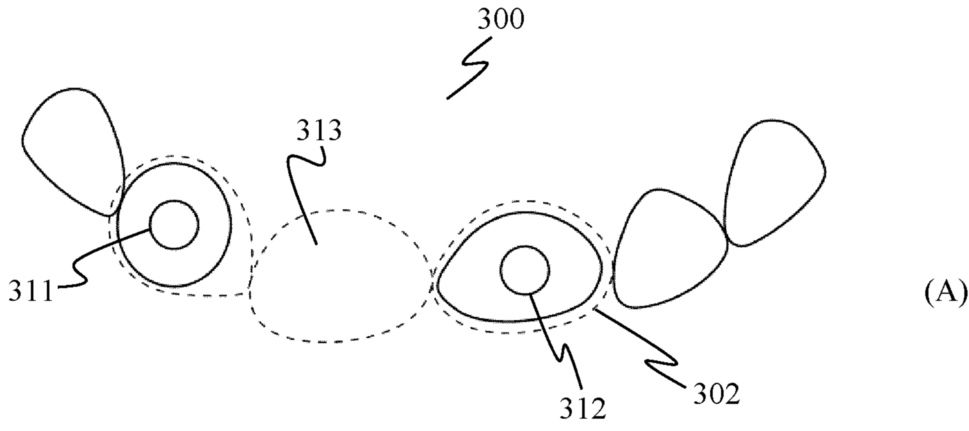
FIG. 3 illustrates a dental situation and a restoration
Figure 3:
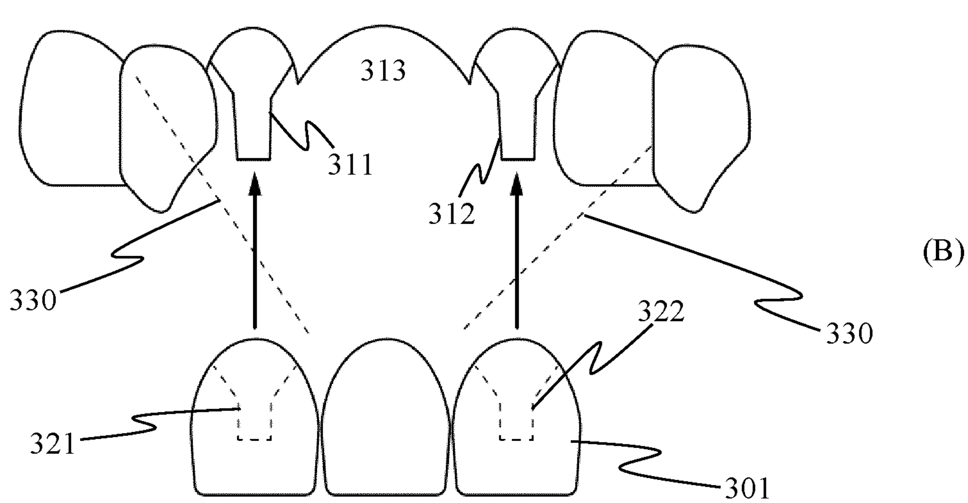
Figure 3:
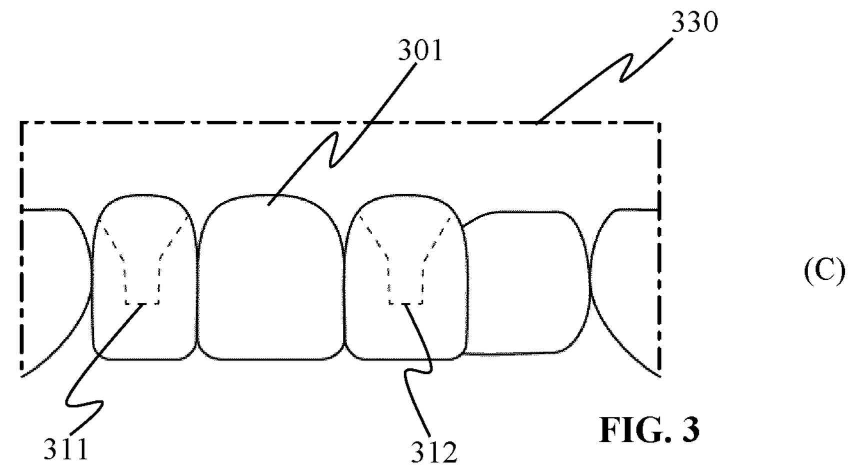

FIG. 3 illustrates a diagram 300 of an example of a dental situation 330 and a corresponding dental restoration 301. The present teachings may be utilized for classifying the dental structure of the restoration 301 and/or the dental situation 330. The diagram 300 relates to constructing of a restoration, which is shown as a screw retained bridge 301. The diagram 300 shows three views (A), (B) and (C) of the dental structure. View (A) is a top view of the dental structure, view (B) is a side view showing deployment of the bridge 301, while view (C) shows the bridge (C) installed at the desired location in a patient's jaw. Initially, the dental structure related to the patient may be recorded as a digital 3D dental model. In case of the dental situation, the 3D model may be acquired, or it may be generated via acquisition performed, via a dental scanner, for example, an intraoral scanning device. The 3D model may be in the form of at least two computerized images or digital files. The 3D model may be a model of the entire oral anatomy of the patient, or it may be a model of a part of the anatomy. For example, the 3D model may be a model of the entire jaw of the patient, or it may be a model of a selected portion of the jaw. An area of selection 330 is shown which represents such a selected portion of the oral anatomy. The area of selection may be used, e.g., for generating the 2D image, e.g., the second 2D image 201 which represents the dental structure to be transformed and/or classified. In this example, the 3D model may be a plurality of images showing the dental situation as in view (A), which is a part of the patient's jaw.

As selected images, one or more depth images or depth map layers may be used, for example, captured at view (A). In some cases, at least one of the images may even be an X-ray and/or a CT image. Preferably, at least one of the images is a depth map. Thus, the X-ray and/or a CT image(s)

is(are) preferably a selected image(s) in addition to at least one another selected image being a depth map. Optionally, one or more feature layers may be provided, for example, the dotted portion 302 shows a boundary for the restoration, in this case the bridge 301 to be installed.

As discussed in the previous FIGS., the selected images which are dissimilar acquisitions of the dental situation are converted to a respective color component of a color model. The boundary 302 can for example be also be provided as a feature layer and converted to one of the color components of the color model.

In the case of the dental restoration, for example, when classifying the bridge 301, the 3D model may be a CAD model which is used to provide dissimilar acquisitions or images of the bridge 301. For example, as was discussed in the previous FIGS., a top image and a bottom image of the bridge 301 may be provided as selected images to generate the 2D image.

Similarly, when the dental structure includes a dental restoration installed in the patient's mouth, process as discussed for dental situation may be used.

The color model can be any representation, standard or customized, comprising a plurality of channels or components specifying the color values. As few examples, the color model may be RGB, RYB, CMY, HSL, HSV, RGBA, RGBW, RGBY or CMYK.

A computer readable 2D image in the selected color model is thus obtained by combining or merging the respective color components.

For example, the 2D image obtained for the dental situation shown in view (A) may be analyzed by a data-driven logic trained with historical 2D images of dental situations. The trained data-driven logic, by detecting specific features of the dental situation, for example, by detecting a first preparation 311 and a second preparation 312, or even a missing dental object, can analyze the 2D image and classify that the dental situation relates to or requires the dental bridge 301.

The dental bridge 301 can either be selected or it may be produced automatically according to the 3D model. For example, the bridge 301 can be provided recesses 321, 322 which match the corresponding preparations 311, 312. The bridge 301 replaces or fills a missing part 313 of the dental structure. In some cases, any procedure to be performed on the patient is at least partially automatically performed in response to the classification value and/or the output signal generated by the trained data-driven logic after analyzing the 2D image of the dental structure. For example, it may also be possible to provide the preparations 311, 312 or their locations automatically by analyzing 2D image of the dental situation prior to the installation of the preparations 311, 312.

The bridge 301 can be installed by mating the respective recesses 321, 322 with their corresponding preparations 311, 312 (see view (C)), either manually or even automatically as an automated dental procedure.

Figure 4:
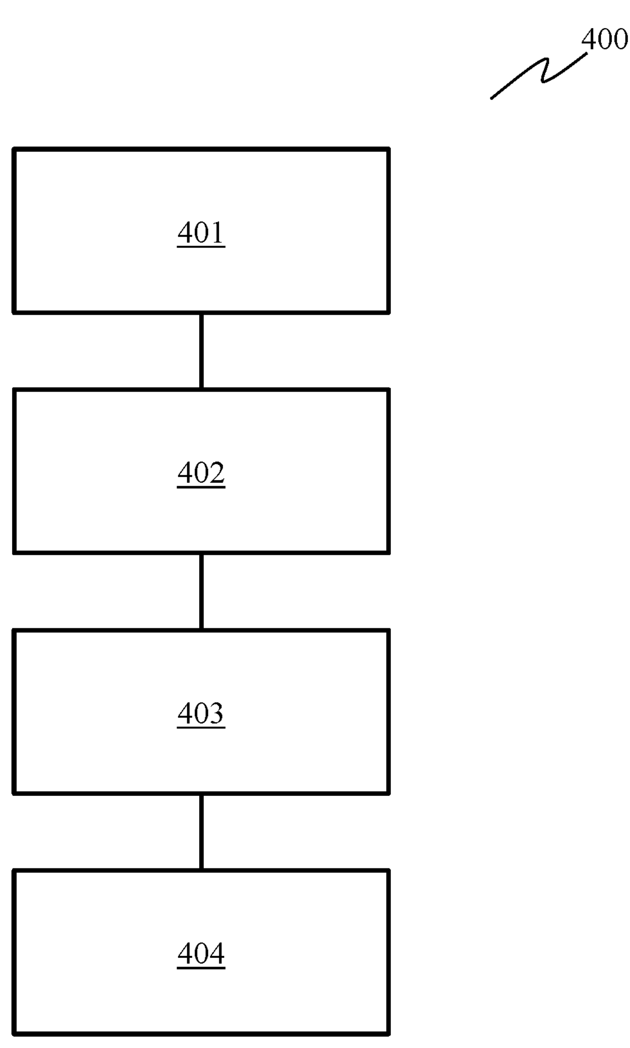
FIG. 4 is a flowchart showing a method aspect of the present teachings.

FIG. 4 illustrates a flowchart or routine 400 transforming a 3D dental model to a 2D dental image as also discussed in the preceding FIGS. The routine 400 may be executed by any one or more suitable computing units or by a dental procedure assisting system.

In block 401, it is provided, at least two selected images from the 3D dental model. The selected images are dissimilar acquisitions of a dental structure. The 3D model may for example be obtained by operatively connecting to a memory location. In block 402, it is converted each of the selected images to a respective color component of a color model. In block 403, it is obtained, by combining the respective color components, the 2D dental image. The 2D image is in a computer-readable format of the color model. In an optional block 404, it is determined, via a trained data-driven logic, a classification value and/or an output signal related to the 2D image. The 2D image may be provided as an input to the trained data-driven logic. The trained data-driven logic is trained preferably with a plurality of historical 2D images relating to a plurality of dental structures.

Figure 5:
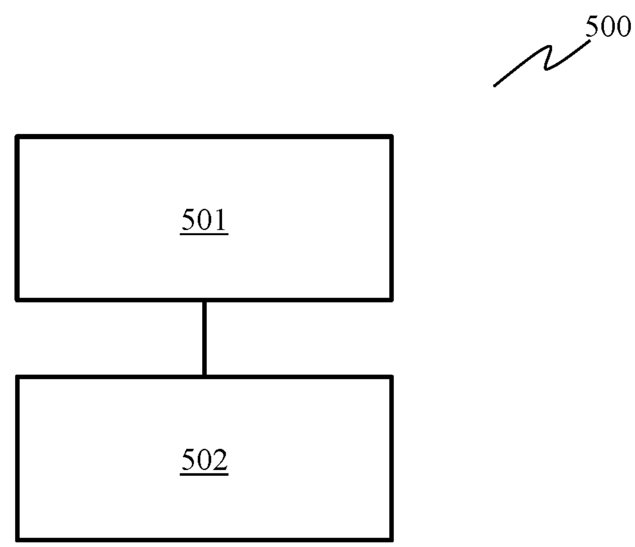
FIG. 5 is a flowchart showing a classification aspect of the present teachings.

FIG. 5 illustrates a further flowchart or another routine 500 for classifying a dental structure using a trained data-driven logic. The another routine 500 may be a part of the routine 400, e.g., as was shown in the block 404, or it may be a standalone routine for classification of 2D images generated elsewhere, for example, in another location or by another computing unit. Those skilled in the art shall appreciate that the present teachings can be advantageously leveraged for classification of dental structures using the 2D image as herein disclosed.

In block 501, it is provided as in input, a 2D image to the trained data-driven logic. As was discussed, the 2D image is similar, or it is the same, as generated in the routine 400. In block 502, it is determined via the data-driven logic, a classification value and/or of the 2D image. The 2D image is in a computer-readable format of a color model. The 2D image has been obtained by converting each of at least two selected images to a respective color component of the color model. The selected images are dissimilar computerized acquisitions of the dental structure.

Figure 6:
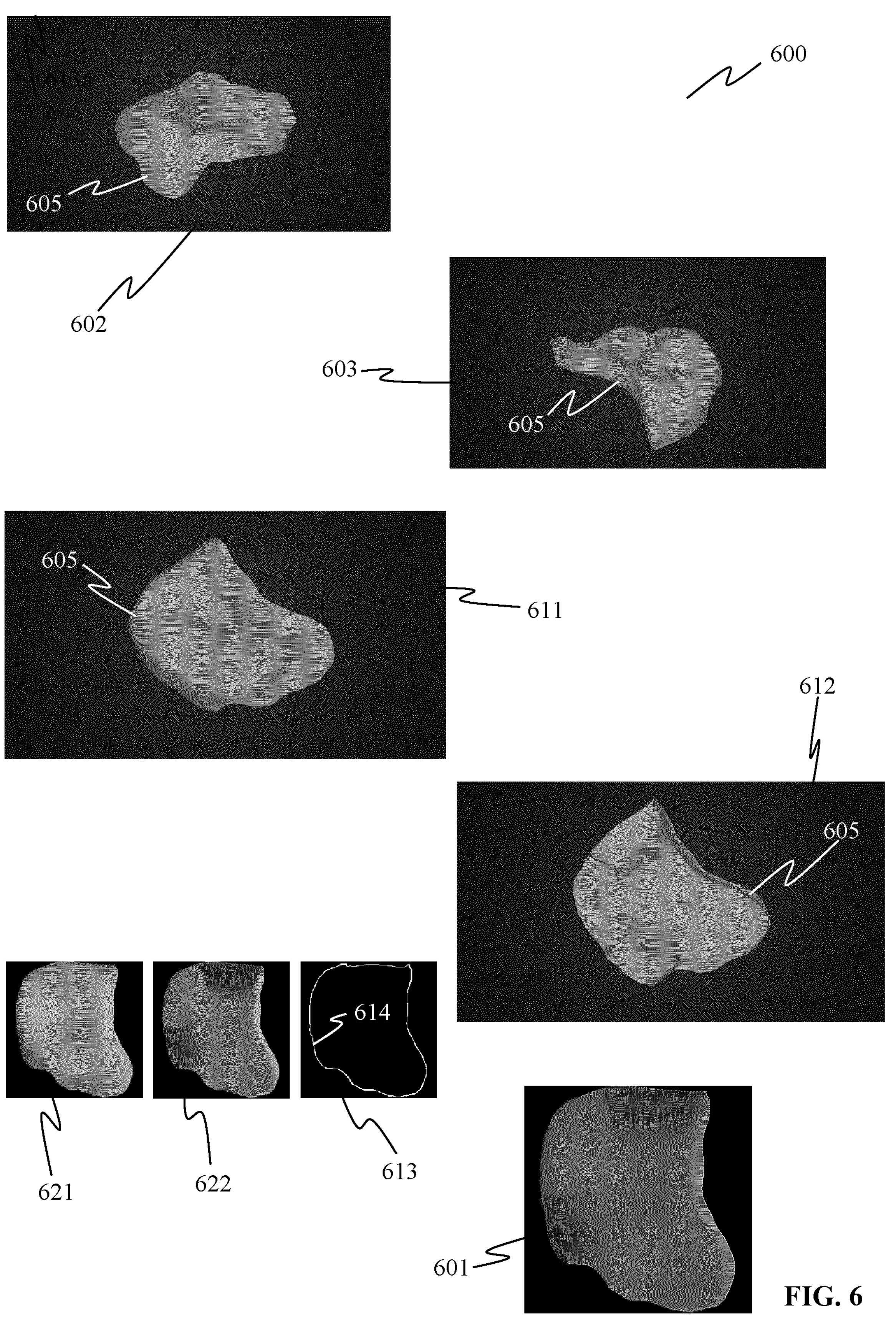
FIG. 6 illustrates an aspect where the selected images are CAD generated.

FIG. 6 illustrates an aspect where the selected images are provided via a CAD software. A plurality 600 of views or images are shown of a CAD generated model. In this example, the selected images provided via the CAD software are used for obtaining a 2D image 601 according to the present teachings. The plurality 600 of views relate to a dental structure, more specifically a restoration, which in this example is shown as an onlay 605. A first view 602 is a perspective 3D virtual view of the onlay 605. An onlay is a dental restoration, which typically is smaller than a dental crown. Those skilled in the art shall appreciate that this non-limiting example can also be applied to other kinds of restorations such as crowns, inlays, or bridges.

A second view 603 is another perspective view of the onlay 605. The second view 603 is a virtual view showing another side, more specifically the opposite side, of the onlay 605 as compared to that shown in the first view 602.

The CAD software can be used to provide views or computerized images of the onlay 605 from different perspectives. In this example, other virtual perspective views, i.e., a top view 611 and a bottom view 612 of the onlay 605 are also shown.

A first selected image 621 is provided via the CAD software which is a depth map representation of a top portion of the onlay 605. The first selected image 621 is thus a depth map representation of the view shown in the top view image 611.

Those skilled in the art shall appreciate that the term "depth map" in the context of present teachings means a dataset comprising information relating to the distance of the surfaces of dental structure from a particular viewpoint or reference. The term depth map may even include similar techniques such as depth buffer, Z-buffer, Z-buffering and Z-depth, etc. It shall be appreciated that "Z" in these terms relates to a convention that the central axis of view of the virtual camera or reference point is in the direction of the camera's Z axis, and not to the absolute Z axis of a scene, e.g., the dental structure.

More specifically, in this example, the first selected image 621 is a depth map comprising information relating to the distance of the surfaces in the top view of the onlay 605. In other words, the first selected image 621 comprises information related to a plurality of spatial distances between a reference point or a virtual camera's position and a plurality of points on the top side surface of the onlay 605.

Similarly, a second selected image 622 is provided via the CAD software which is a depth map representation of a bottom portion of the onlay 605. The second selected image 622 is thus a depth map representation corresponding to the view shown in the bottom view image 612. It shall be understood that the top view 611 and a bottom view 612 images are just shown for showing a visual representation of these views. These images are not essential for providing the selected images. In certain cases, "side" views may even be used, e.g., two opposing side views of a dental structure.

The selected images 621 and 622 are thus dissimilar acquisitions captured along the same axis of the onlay 605. Those skilled in the art shall appreciate that any other suitable axis of the onlay could be used to capture or provide the selected images or views of the onlay 605. In some cases, any one or more of the selected images 621, 622 may be processed, for example, applied one or more transformations such as mirroring, rotating, cropping, normalizing, aligning, etc.

As it was discussed in preceding FIGS., each of the selected images 621, 622 are converted to a respective color component of a color model. The 2D image 601 can thus be provided by combining the respective color components. Color component images are not explicitly shown in FIG. 6, however they have been discussed in detail in the present disclosure, e.g., the in previous FIGS. The 2D image 601 thus includes features from both the top view 621 and the bottom view 622 depth maps. Moreover, the color components containing said features create color patterns in the 2D image which can be detected by a data-driven logic which is trained using similar images. Such a data-driven logic can thus be used to classify the 2D image 601 and thus assist the user to perform the correct type of procedure on a patient.

Optionally, there can even be a third selected image 613, which can be a feature layer. The feature layer 613 may also be provided the CAD software, or it may be added by another module. The feature layer 613 may include a boundary 614 related to the onlay 605. The boundary 614 may for example represent preparation margin. The 2D image 601 may thus also include the feature layer 613 which has been converted to a color component different from the color components which are used for the top view 621 and the bottom view 622 selected images.

In some cases, there can be more than three selected images. In such cases, a fourth selected image (not shown here) can be used to provide another depth image or another feature layer.

Those skilled in the art shall also appreciate that aspects where CAD images, e.g, depth maps and/or feature layers are combined with photographic and/or X-ray acquisitions to generate a 2D image are also possible.

The method steps may be performed in the order as shown listed in the examples or aspects. It should be noted, however, that under specific circumstances a different order may also be possible. Further, it is also possible to perform one or more of the method steps once or repeatedly. These steps may be repeated at regular or irregular time periods.

Further, it is possible to perform two or more of the method steps simultaneously or in a timely overlapping fashion, specifically when some or more of the method steps are performed repeatedly. The method may comprise further steps which are not listed.

The word "comprising" does not exclude other elements or steps, and the indefinite article "a" or "an" does not exclude a plurality. A single processing means, processor or controller or other similar unit may fulfill the functions of several items recited in the claims. The mere fact that certain measures are recited in mutually different dependent claims does not indicate that a combination of these measures cannot be used to advantage. Any different signs in the claim should not be construed as limiting the scope.

Further, it should be noted that in the present disclosure, the terms "at least one", "one or more" or similar expressions indicating that a feature or element may be present once or more than once typically may have been used only once when introducing the respective feature or element. Thus, in some cases unless specifically stated otherwise, when referring to the respective feature or element, the expressions "at least one" or "one or more" may not have been repeated, notwithstanding the fact that the respective feature or element may be present once or more than once.

Further, the terms "preferably", "more preferably", "particularly", "more particularly", "specifically", "more specifically" or similar terms are used in conjunction with optional features, without restricting alternative possibilities. Thus, any features introduced by these terms are optional features and are not intended to restrict the scope of the claims in any way. The present teachings may, as those skilled in the art will recognize, be performed by using alternative features. Similarly, the features introduced by "according to one aspect" or similar expressions are intended to be optional features, without any restriction regarding alternatives to the present teachings, without any restrictions regarding the scope of the present teachings and without any restriction regarding the possibility of combining the features introduced in such way with other optional or non-optional features of the present teachings.

Unless otherwise defined, all technical and scientific terms used herein have the same meaning as commonly understood by one of ordinary skill in the art to which the present teachings belong.

Various examples have been disclosed above for a method, a system, a device, a use, software program, and a computing unit comprising the computer program code for carrying out the methods herein disclosed. For example, it has been disclosed a method for transforming a digital 3D dental model to a 2D dental image, the method comprising: providing, at least two selected images from the 3D dental model; converting, each of the selected images, to a respective color component of a color model; obtaining, by combining the respective color components, the 2D image in a computer-readable format of the color model. The present teachings also relate to a method of classification of the 2D image, a system, a device, a use, data, and a storage medium. Those skilled in the art will understand however that changes and modifications may be made to those examples without departing from the spirit and scope of the accompanying claims and their equivalence. It will further be appreciated that aspects from the method and product embodiments discussed herein may be freely combined.

Any headings utilized within the description are for convenience only and have no legal or limiting effect.

It shall be clear to those skilled in the art that when referring to embodiments in the claims or clauses, statements such as "any of the claims a b", mean "any one or more of the claims a, b, and/or any of the claims that lie in between a and b". Thus, "any of the claims a b" is supposed to specify embodiments which include the features of: claim a and/or claim b and/or any one of the claims between a and b and/or any combination of any two or more the claims from a until b; a and b being respective claim numbers.

Summarizing and without excluding further possible embodiments, certain example embodiments of the present teachings are summarized in the following clauses:

Clause 1. A computer-implemented method for transforming a digital three-dimensional ("3D") dental model to a non-photorealistic two-dimensional ("2D") dental image, which method comprises:

providing, at least two selected images from the 3D dental model, wherein the selected images are dissimilar acquisitions of a dental structure, converting, each of the selected images, to a respective color component of a color model;

obtaining, by combining the respective color components, the non-photorealistic 2D image in a computer-readable format of the color model.

Clause 2. The method according to clause 1, wherein at least one of the selected images is a depth map representation of the dental structure.

Clause 3. The method according to clause 1 or clause 2, wherein at least one of the selected images is a feature layer representative of boundaries and/or regions of interest and/or attributes of the dental structure.

Clause 4 The method according to any of the above clauses, further comprising:

providing, as an input, the non-photorealistic 2D image to a trained data-driven logic;

determining, via the data-driven logic, a classification value of the non-photorealistic 2D image.

Clause 5. A computer-implemented method for classifying a dental structure using a trained data-driven logic, which method comprises:

providing, as an input, a 2D image to the trained data-driven logic;

determining, via the data-driven logic, a classification value of the 2D image;

wherein the 2D image is in a computer-readable format of a color model, and wherein the 2D image has been obtained by converting each of at least two selected images to a respective color component of the color model, and wherein the selected images are dissimilar computerized acquisitions of the dental structure.

Clause 6. The method according to clause 4 or clause 5, wherein the data-driven logic comprises a convolutional neural network.

Clause 7. The method according to any of the clauses 4-clause 6, further comprising:

generating, in response to the classification value, an output signal.

Clause 8. The method according to any of the clauses 4-clause 7, wherein the classification value and/or the output signal is provided to a human machine interface ("HMI").

Clause 9. The method according to clause 7 or clause 8, wherein the output signal is indicative of a dental procedure.

Clause 10. The method according to any of the clause 4-clause 9, further comprising:

automatically selecting, in response to the classification value and/or the output signal, a tool for use in the dental procedure.

Clause 11. The method according to clause 9 or clause 10, further comprising:

receiving, via the HMI, a feedback input indicative of whether the dental procedure indicated by the output signal is to be performed or not.

Clause 12. The method according to any of the above clauses, further comprising:

providing, at a memory storage, the 2D image, and optionally also the feedback input.

Clause 13. The method according to any of the clause 4-clause 12, further comprising:

providing, at an input of data-driven logic, model training data comprising a plurality of historical 2D images, and the model training data optionally comprising also corresponding feedback inputs to at least some of the historical 2D images; whereby the model training data is used to train the data-driven logic to obtain the trained data-driven logic.

Clause 14. The method according to any of the above clauses wherein, the dental structure is, or it comprises, a dental situation.

Clause 15. The method according to any of the above clauses wherein, the dental structure is, or it comprises, a dental restoration.

Clause 16. The method according to any of the above clauses wherein, the 3D dental model is at least partially a CAD model or file.

Clause 17. The method according to clause 16, wherein at least one of the selected images are provided via a CAD software.

Clause 18. A system for assisting a dental procedure, wherein the system is configured to perform the steps of any of the above method clauses.

Clause 19. A dental procedure assisting system, wherein the system comprises at least one computing unit, the system being configured such that any one or more of the computing units is configured to:

provide, from a digital three-dimensional ("3D") dental model, at least two of computerized images as selected images, wherein the selected images are dissimilar acquisitions of a dental structure, convert, each of the selected images, to a respective color component of a color model; and obtain, by combining the respective color components, the 2D image in a computer-readable format of the color model.

Clause 20. A dental procedure assisting system, wherein the system comprises at least one computing unit, the system being configured such that any one or more of the computing units is configured to:

provide, as an input, a 2D image to the trained data-driven logic;

determine, via the data-driven logic, a classification value of the 2D image;

wherein the 2D image is in a computer-readable format of a color model, and wherein the 2D image has been obtained by converting each of at least two selected images to a respective color component of the color model, and wherein the selected images are dissimilar computerized acquisitions of a dental structure.

Clause 21. A computer software product, or a non-transitory computer-readable storage medium storing the program, comprising instructions which when executed by a suitable computing unit cause the computing unit to perform the steps of any of the above method clauses.

Clause 22. A computer software product, or a non-transitory computer-readable storage medium storing the program, comprising instructions which when executed by a suitable computing unit cause the computing unit to:

provide, from a digital three-dimensional ("3D") dental model, at least two of the computerized images as selected images, wherein the selected images are dissimilar acquisitions of a dental structure, convert, each of the selected images, to a respective color component of a color model; and obtain, by combining the respective color components, the 2D image in a computer-readable format of the color model.

Clause 23. A computer software product, or a non-transitory computer-readable storage medium storing the program, comprising instructions which when executed by one or more suitable computing units cause any one or more of the computing units to:

provide, as an input, a 2D image to the trained data-driven logic;

determine, via the data-driven logic, a classification value of the 2D image;

wherein the 2D image is in a computer-readable format of a color model, and wherein the 2D image has been obtained by converting each of at least two selected images to a respective color component of the color model, and wherein the selected images are dissimilar computerized acquisitions of a dental structure.

Clause 24. Model training data, or a data storage medium storing the model training data, as specified in any of the clauses 13-17.

Clause 25. Use of the model training data as generated or specified in any of the clauses 13-17 for: training a data-driven model, and/or determination of a classification value and/or an output signal indicative of a dental procedure and/or selection of a tool for use in a dental procedure.

Clause 26. Use of the classification value and/or the output signal as generated in any of the method clauses 4-17 for assisting and/or performing a dental procedure.

The invention claimed is:

1. A computer-implemented method for classifying a dental structure using a trained data-driven logic comprising:

accessing a first 2D image and a second 2D image, the first and second 2D images of a color 3D model of the dental structure;

converting the first 2D image to include only a first color component of a multi-color model, the first color component being a constituent color channel from the multi-color model;

converting the second 2D image to include only a second color component of the multi-color model, the second color component being a different constituent color channel than that of the first color component;

compositing the converted first 2D image and the converted second 2D image to produce a composite 2D image;

providing, as an input, a composite 2D image to the trained data-driven logic;

determining, via the trained data-driven logic, a classification value of the composite 2D image;

wherein the first and second 2D images are dissimilar computerized acquisitions of the dental structure that were used to generate the color 3D model.

2. The method of claim 1, wherein the data-driven logic comprises a convolutional neural network.

3. The method of claim 1, further comprising:

generating, in response to the classification value, an output signal.

4. The method of claim 3, wherein the classification value and/or the output signal is provided to a human machine interface ("HMI").

5. The method of claim 4, wherein the output signal is indicative of a dental procedure.

6. The method of claim 5, further comprising:

automatically selecting and configuring, in response to the classification value and/or the output signal, a tool from a plurality of available tools for use in the dental procedure, wherein the plurality of available tools include a milling tool, a grinding tool, and a printing tool.

7. The method of claim 5, further comprising:

receiving, via the HMI, a feedback input indicative of whether the dental procedure indicated by the output signal is to be performed or not.

8. The method of claim 3, further comprising:

using the classification value and/or the output signal for assisting and/or performing a dental procedure.

9. The method of claim 1, further comprising:

providing, at a memory storage, the composite 2D image, and optionally also a feedback input.

10. The method of claim 1, further comprising:

providing, at an input of data-driven logic, model training data comprising a plurality of 2D images, and optionally also a feedback input; whereby the model training data is used to train the data-driven logic to obtain the trained data-driven logic.

11. The method of claim 10, further comprising:

using the model training data for: training a data-driven model, and/or validating a data-driven model, and/or determination of a classification value and/or an output signal indicative of a dental procedure and/or selection of a tool for use in a dental procedure.

12. A computer-implemented method for transforming a digital three-dimensional ("3D") dental model to a non-photorealistic two-dimensional ("2D") dental image, comprising:

accessing a first 2D image and a second 2D image, the first and second 2D images being of the 3D dental model, wherein the first and second 2D images are dissimilar acquisitions of a dental structure, converting the first 2D image to include only a first color component of a multi-color model, the first color component being a constituent color channel from the multi-color model;

converting the second 2D image to include only a second color component of the multi-color model, the second color component being a different constituent color channel than that of the first color component, obtaining, by combining the converted first 2D image and the converted second 2D image, the non-photorealistic 2D dental image in a computer-readable format of the multi-color model, wherein the first and second 2D images are dissimilar computerized acquisitions of the dental structure that were used to generate the 3D dental model.

13. The method of claim 12, wherein at least one of the first or second 2D images is a depth map representation of the dental structure.

14. The method of claim 12, wherein at least one of the first or second 2D images is a feature layer representative of boundaries and/or regions of interest and/or attributes of the dental structure.

15. The method of claim 12, further comprising:

providing, as an input, the non-photorealistic dental 2D image to a trained data-driven logic;

determining, via a data-driven logic, a classification value of the non-photorealistic 2D dental image.

16. A system for classifying a dental structure using a trained data-driven logic comprising a processor configured to:

provide, as an input, a composite 2D image to the trained data-driven logic;

determine, via the trained data-driven logic, a classification value of the composite 2D image;

wherein the composite 2D image is in a computer-readable format of a color 3D model, and wherein the composite 2D image is obtained by converting a first 2D image of a digital 3D model to include only a first color component of a multi-color model, the first color component being a constituent color channel from the multi-color model, converting a second 2D image of the digital 3D model to include only a second color component of the multi-color model, the second color component being a different constituent color channel than that of the first color component, and compositing the converted first 2D image and the converted second 2D image to produce the composite 2D image, and wherein the first and second 2D images are dissimilar computerized acquisitions of the dental structure that were used to generate the color 3D model.

17. A non-transitory computer-readable storage medium storing a program, comprising instructions for classifying a dental structure using a trained data-driven logic, which when executed by a computing unit cause the computing unit to:

provide, as an input, a composite 2D image to the trained data-driven logic;

determine, via the trained data-driven logic, a classification value of the composite 2D image;

wherein the composite 2D image is in a computer-readable format of a color 3D model, and wherein the composite 2D image is obtained by converting a first 2D image of a digital 3D model to include only a first color component of a multi-color model, the first color component being a constituent color channel from the multi-color model, converting a second 2D image of the digital 3D model to include only a second color component of the multi-color model, the second color component being a different constituent color channel than that of the first color component, and compositing the converted first 2D image and the converted second 2D image to produce the composite 2D image, and wherein the first and second 2D images are dissimilar computerized acquisitions of the dental structure that were used to generate the color 3D model.

* * * * *